Nov. 29, 1938.  D. J. CAMPBELL  2,138,623
FOUNDRY MOLDING
Filed June 15, 1936  10 Sheets-Sheet 1

Nov. 29, 1938.   D. J. CAMPBELL   2,138,623
FOUNDRY MOLDING
Filed June 15, 1936   10 Sheets-Sheet 3

INVENTOR
Donald J. Campbell
BY Liverance & Van Antwerp
ATTORNEY

Nov. 29, 1938.  D. J. CAMPBELL  2,138,623
FOUNDRY MOLDING
Filed June 15, 1936   10 Sheets-Sheet 4

Nov. 29, 1938.   D. J. CAMPBELL   2,138,623
FOUNDRY MOLDING
Filed June 15, 1936   10 Sheets-Sheet 9

INVENTOR
Donald J. Campbell

Patented Nov. 29, 1938

2,138,623

UNITED STATES PATENT OFFICE 2,138,623

FOUNDRY MOLDING

Donald J. Campbell, Spring Lake Township, Ottawa County, Mich., assignor to Campbell, Wyant & Cannon Foundry Company, Muskegon Heights, Mich., a corporation of Michigan Application June 15, 1936, Serial No. 85,318

13 Claims. (Cl. 22—22)

This invention relates to foundry molding, and is particularly concerned with a novel apparatus and method of producing grooved molds whereby the casting which results from pouring molten iron into the mold is provided with projecting ribs in conformity with the grooves in the mold. The invention is particularly adapted for the production of brake drums for motor vehicles which may be cast in one piece and have projecting from the immediate braking annular flange of the drum a plurality of continuous fins or ribs which aid greatly in the dissipation of heat which is generated on applying the brakes to the inner side of the brake drum flange, thereby raising the temperature of the brake drum, particularly the temperature of the annular braking flange, and with respect to which it is very desirable that the heat be dissipated to the atmosphere as rapidly as possible.

An object of the invention, among others, is to provide a very practical and serviceable machine that will cut and smooth an annular groove, or a number of spaced apart annular grooves in the inner periphery of the molds whereby radially extending heat dissipating ribs integral with the brake drum which is cast and extending outwardly at the outer peripheral surface of the brake drum flange are produced. It is a further object to produce grooved sand molds of uniform density throughout the same structure of the mold, and thus provide a mold wherein there can be cast a circumferential radially ribbed brake drum having a smooth outer surface free from imperfections. A still further object of the invention is to produce a machine whereby the cutting and smoothing of the grooves in the mold may be accomplished rapidly and with economy as to cost. And a still further object is to produce a machine and operate it in accordance with a method of operation whereby a substantially perfect mold for casting cast iron or cast steel brake drums or analogous structures with integral annular outwardly extending ribs is accomplished in a very satisfactory, practical and economical manner. Other objects and purposes not at this time particularly stated will be apparent upon an understanding of the invention from the following description, taken in connection with the accompanying drawings illustrating one machine embodiment of the invention, in which drawings—

Like reference characters refer to like parts in the different figures of the drawings.

Figure 5:
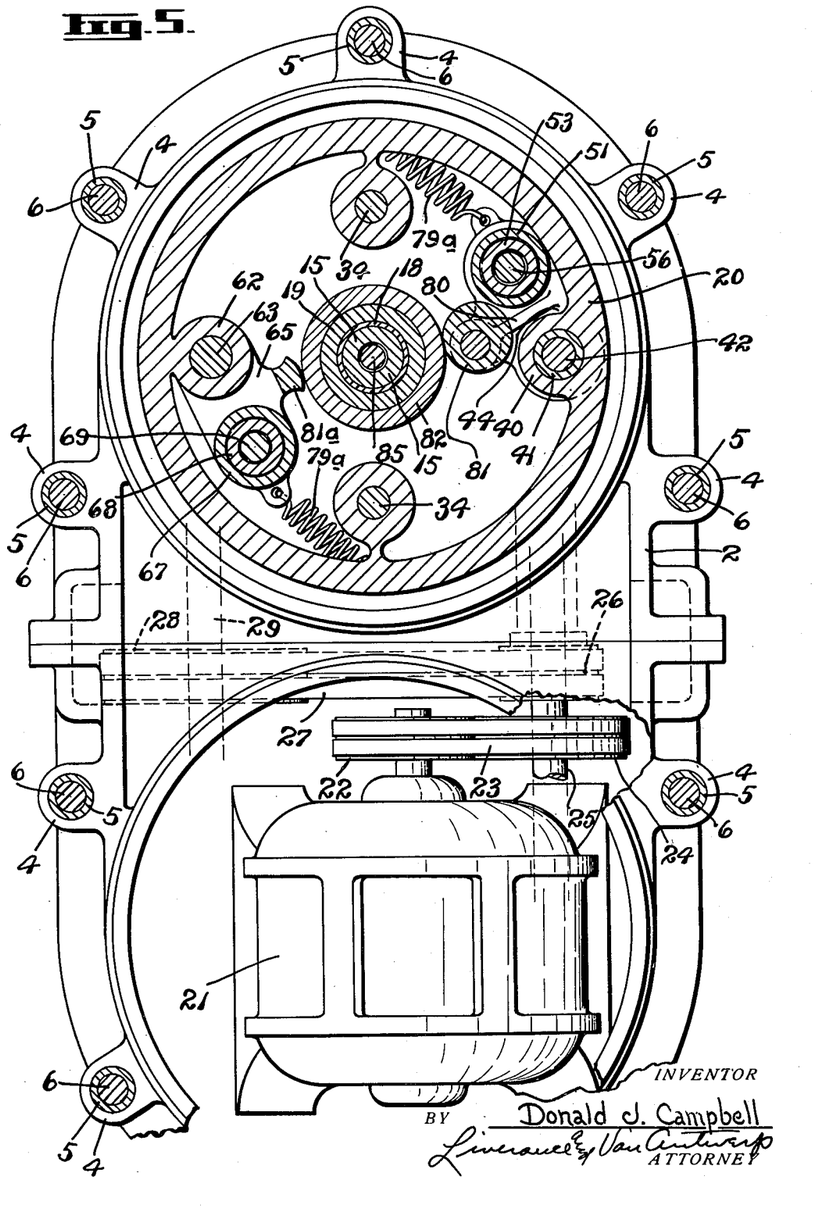
Fig. 5 is a horizontal section substantially on the plane of line B—B of Fig. 2.
Figure 6:
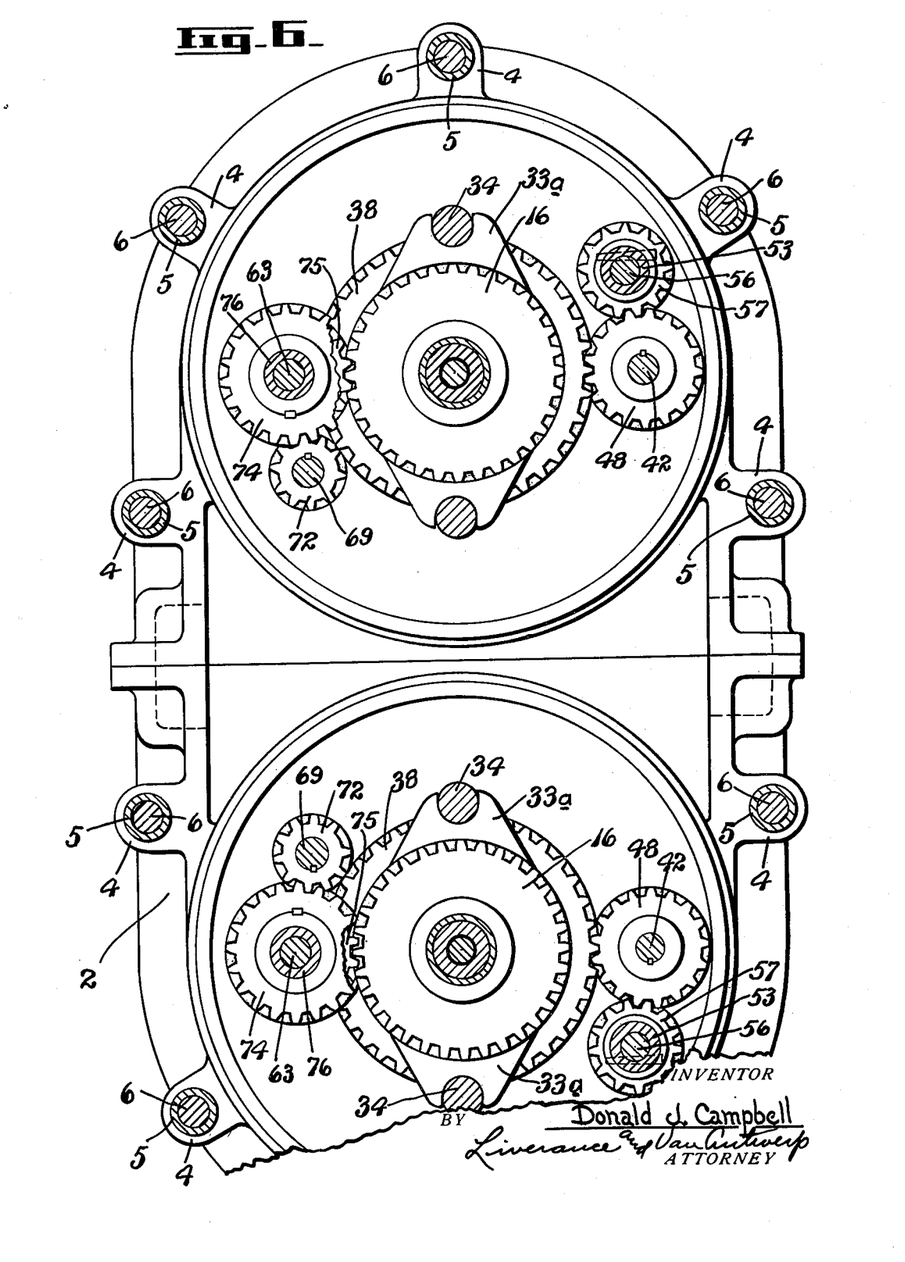
Fig. 6 is a horizontal section substantially on the plane of line C—C of Fig. 2.
Figure 7:
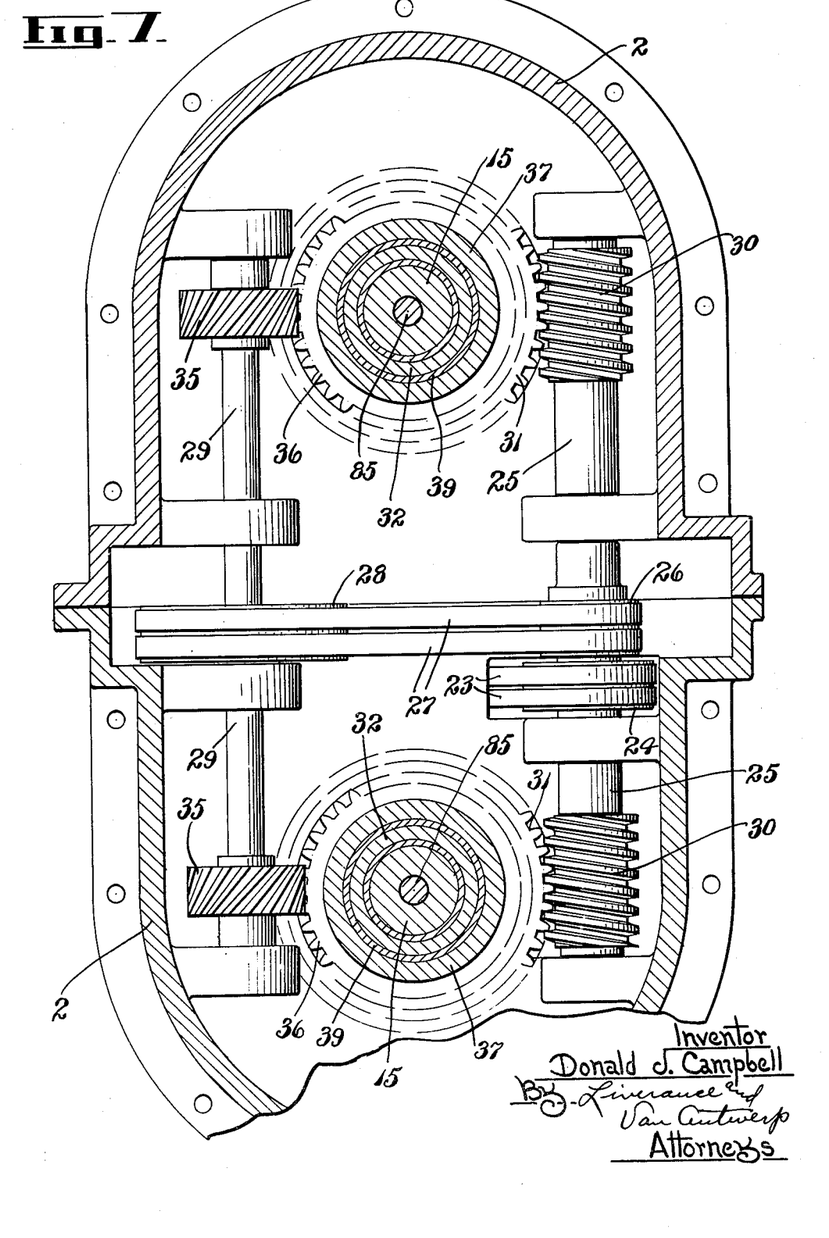
Fig. 7 is a horizontal section substantially on the plane of line D—D of Fig. 2.

With the embodiment of the machine which is illustrated in the drawings, there are to be produced with each operation of the machine the grooving of two mold cavities for the flange portions of the brake drums. A supporting and housing structure of the machine comprises a lower or base section 1, above which is a section 2, both being of a hollow construction and connected together by bolts 3 which pass through outwardly extending flanges on the sections 1 and 2 at their meeting ends. At the upper end of the section 2 there are provided a plurality of outwardly extending ears 4. With reference to Figs. 5, 6 and 7 it will be apparent that the base section and the section 2 above it are each made of two halves, the open end portions of which are brought together as illustrated in such figures and are secured together by any suitable means such as bolts (not shown) similar to the bolts 3.

Figure 2:
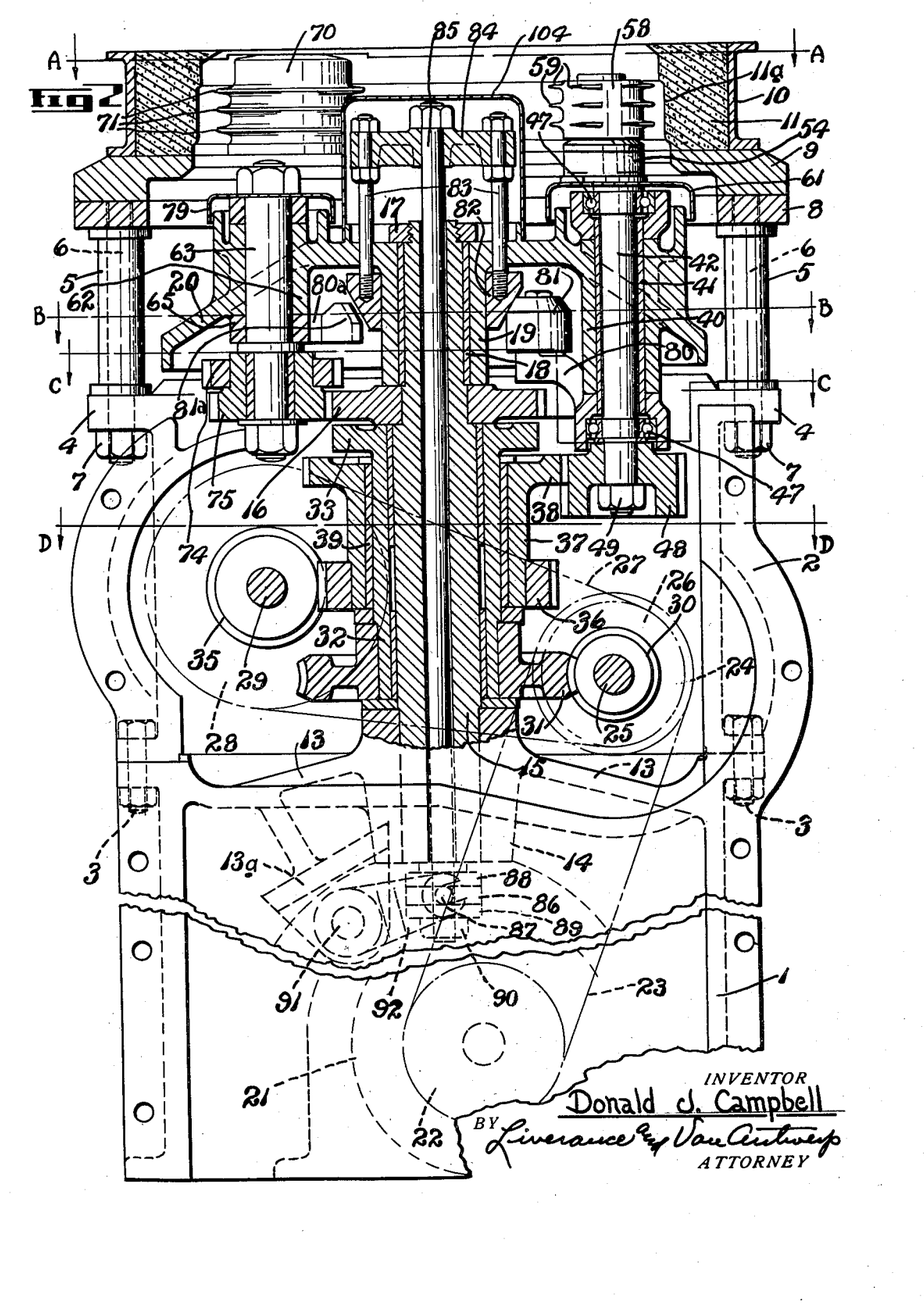
Fig. 2 is a view similar to Fig. 1 but with the specific mechanism used for cutting the grooves and smoothing the same illustrated in vertical section.
Figure 3:
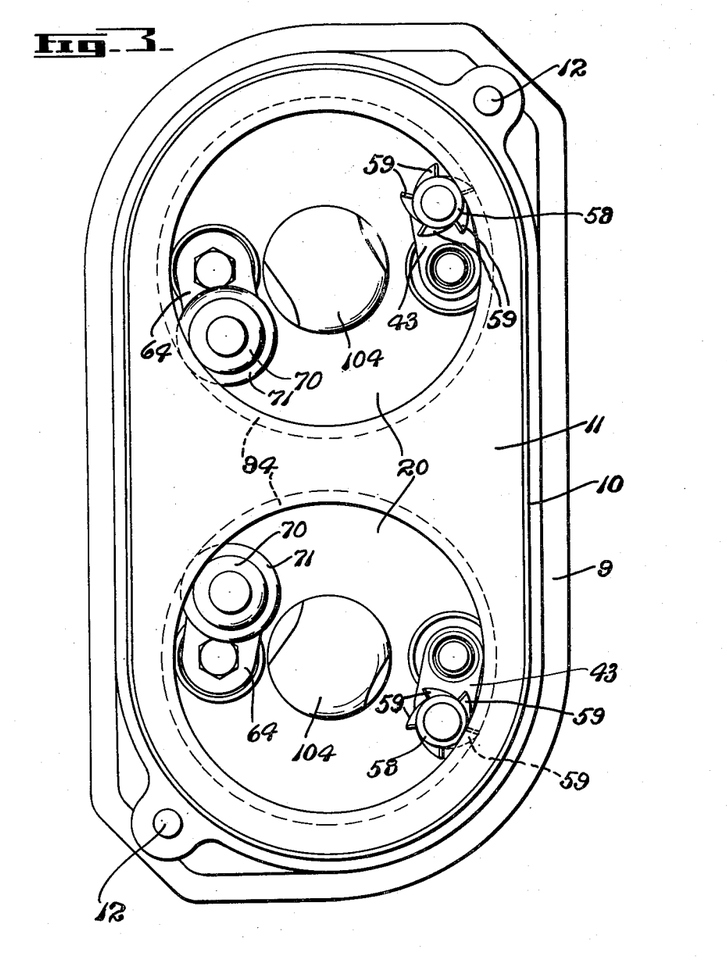
Fig. 3 is a plan view of the machine with a double mold thereon, and illustrating the grooved cutting members and the smoothing or slicking members for the grooves.

Spaced sleeves 5 are located vertically one above each of the ears or lugs 4 around rods 6 which are shouldered or provided with collars adjacent their lower ends as shown in Fig. 2 to bear upon the lugs 4 and are threaded at their lower ends to receive nuts 7. A ring-like table 8 is connected with and supported by the upper ends of the bolts or rods 6 upon and above which rests a mold supporting member 9. The mold is within a flask 10 and the said mold, indicated at 11, within the flask, is provided with two mold cavities longitudinally spaced from each other and the cavities having smooth curved surfaces 11a shown in Figs. 2 and 12. The flask 11 is accurately positioned upon its supporting member 9 through the utilization of dowel pins 12 on said member 9 which extend upwardly through suitable ears having dowel pin openings as best shown in Fig. 3. It is, of course, to be understood that the mold 11 within the flask 10 and with the smooth surfaces 11a as described is made in any suitable manner prior to placing the mold within its flask 10 upon and at the upper end of the grooving machine and that after the grooves have been made the mold 11 and flask 10 may be removed from the machine to be used in casting. This will be hereinafter described.

In the upper portion of the lower supporting section 1 of the machine a suitable supporting web or bracket 13 extends across between the sides of said section and from this web a hub 14, integral therewith, projects downwardly, one for each of the grooving and smoothing mechanisms which is incorporated in the machine. There being two of these mechanisms, two hubs 14 are provided spaced from each other and also spaced a distance from the transverse medial plane of the base section 1. Within each of these hubs the lower end portion of a vertical stationary shaft 15 is received (see Fig. 2) each shaft extending a considerable distance above the upper end of the hub. From a distance below its upper end to said upper end the stationary shaft is reduced in diameter. A gear 16 is fixed on the shaft immediately above the shoulder which is provided between the larger portion of the shaft and the smaller upper portion thereof as shown in Fig. 2. The upper end of the stationary shaft is still further reduced in diameter and screw threaded to receive a nut 17 which clamps against the upper shoulder on the stationary shaft and forms a thrust member for the end of a sleeve 18 revolubly mounted around the upper end portion of the stationary shaft 15 and bearing at its lower end against the hub of the gear 16.

A head for each of the shafts 15, comprising a central vertical sleeve-like hub 19 and an outwardly and downwardly extending table 20 cast integrally with the hub, is mounted for rotation, one at the upper end portion of each of said stationary shafts 15, the hub 19 passing over the sleeve 18 and having a loose or running fit connection therewith whereby each head may turn about the shaft.

A single driving motor 21 is used to drive both of the sleeves 32 and the other mechanisms of the two grooving and smoothing units. This motor may be an electric motor, as shown in Fig. 5, and on the motor shaft a driving pulley 22 is secured, endless belts 23 passing around the same and also around a driven pulley 24 fixed to a longitudinal shaft 25 (see Fig. 7) which is mounted in suitable bearings made in brackets projecting inwardly from the side walls of the lower housing section 2 of the machine. Likewise on the shaft 25 are additional belt pulleys 26 with endless belts 27 passing around the same and also around driven pulleys 28 secured on a horizontal shaft 29 which is located at the opposite side of the supporting base or housing section 2 and similarly mounted on inwardly extending brackets as shown in Fig. 7. Both shafts continuously rotate while the motor 23 is in operation but the rotation of the shaft 29 is slower than the rotation of the shaft 25.

Figure 10:
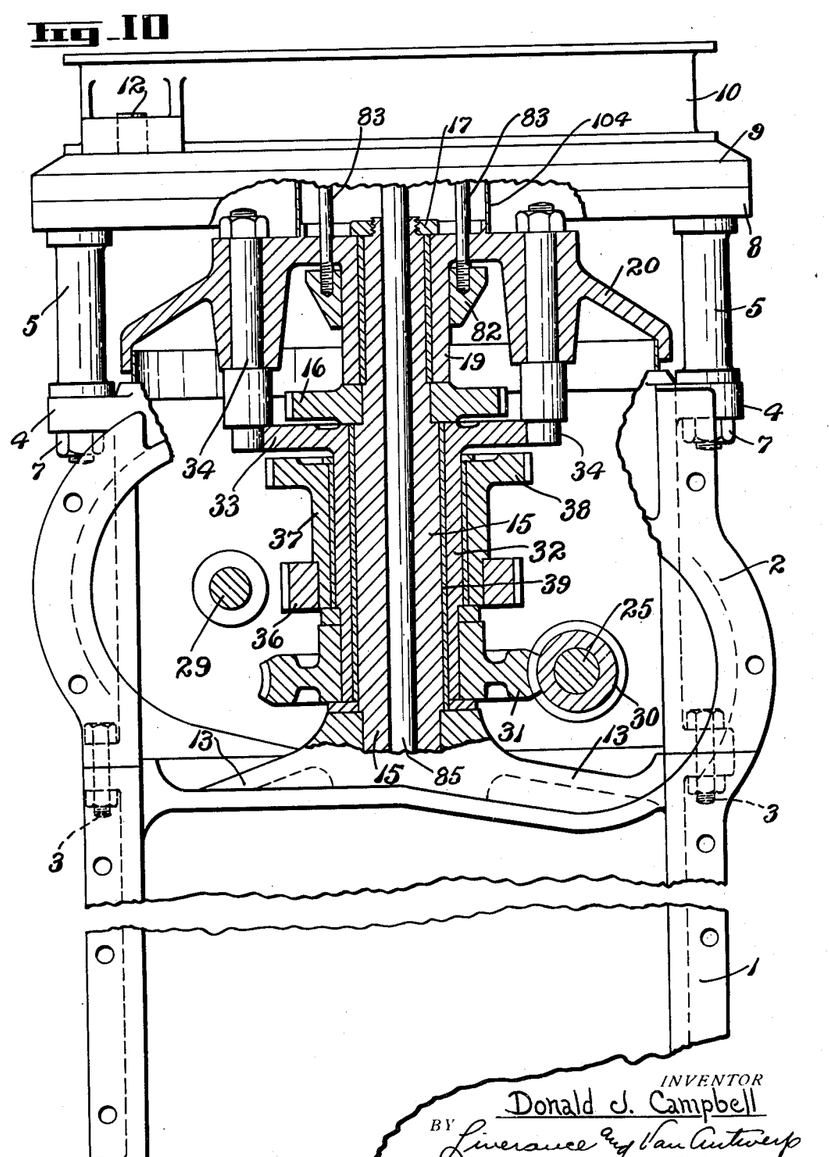
Fig. 10 is a fragmentary vertical sectional view showing the manner in which the head which carries the groove cutting and groove smoothing members is driven.

Two worms 30, one for each of the groove cutting and smoothing mechanisms present in the machine, are connected with the shaft 25 and are in mesh with worm or tangent wheels 31, which are secured in fixed relation to and about the lower end portions of sleeves 32 which are revolubly mounted on and around the stationary shaft 15 and extend upwardly to the underside of the gears 16. At its upper end each sleeve 32 is provided with a horizontal drive member 33 which, as shown in Figs. 6 and 10, has oppositely extending projections 33a, each recessed at its outer end for the reception of a pin 34, two of which are securely connected with the table 20 and extend downwardly so that their lower ends are received in the recesses of the parts 33a (Figs. 6 and 10). Thus both sleeves 32 are driven from the electric motor 21, and the heads comprising the table 20 and the hubs 19 are rotated about the axes of stationary shafts 15.

The shaft 29 is equipped with helical or spiral gears 35, one for each unit of the machine, which mesh with cooperating gears 36, one secured to the lower end of each of two sleeves 37, which are equipped with gears 38 at their upper ends and which are mounted for rotation about the sleeves 32 previously described, there being a cylindrical bearing sleeve 39 between the two sleeves or hubs 32 and 37 in each unit of the machine.

For mounting the groove cutting element of each of the two units of the machine illustrated, a vertical sleeve 40 is cast integral with and extends downwardly from each of the two tables 20 at one side thereof through which a bearing sleeve 41 passes and through which in turn a shaft 42 extends. Upper and lower arms 43 and 44, respectively, are located above and below the ends of the sleeve 40 (Fig. 8) and are provided with anti-friction bearing housings 45 and 46, respectively, in which ball bearings 47 are located around the upper end and near the lower end of the shaft 42. The shaft 42 is equipped with a head at its upper end to bear against the upper bearing 47 and at its lower end extends a distance below the lower bearing and has mounted thereon a gear 48 which is in meshing engagement with the gear 38 previously described (Fig. 2). A nut 49, threaded onto the lower end of shaft 42, holds the gear 48 in place.

Figure 8:
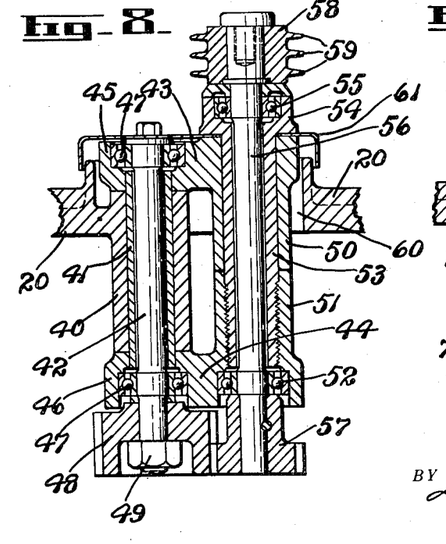
Figs. 8 and 9 are vertical sectional views of the details of mechanism used for driving, respectively, the groove cutter and the smoothing head for said grooves.

The free end portion of the arm 43 has a downwardly extending sleeve section 50 cast integral therewith, and the free end portion of the arm 44 has an upwardly extending sleeve 51 similarly cast with it, the ends of the sleeves 50 and 51 being positioned in abutting engagement (Fig. 8). A ball bearing 52 is housed in the lower end of the sleeve 51. The sleeve 51 is interiorly threaded and a relatively long sleeve 53, exteriorly threaded at its lower end, passes through both sleeves 50 and 51 and threads into the lower sleeve 51. At its upper end it is provided with an enlarged bearing receiving housing 54 in which a ball bearing 55 is located. A shaft 56 passes through the bearings 52 and 55 and through the sleeve 53, being rotatably mounted therein, and at its lower end has a pinion 57 keyed thereto which is in meshing engagement with the gear 48. At the upper end of the shaft a grooved cutting head 58 is secured having projecting therefrom a plurality of series of spaced cutters 59, said series lying in parallel horizontal planes. It is to be understood that while three of the series of cutters 59 are shown on the head, the number can be varied and there is no specific limitation with respect to the particular number of cutters which are used or the number of grooves which may be cut in the mold with such cutters.

Figure 4:
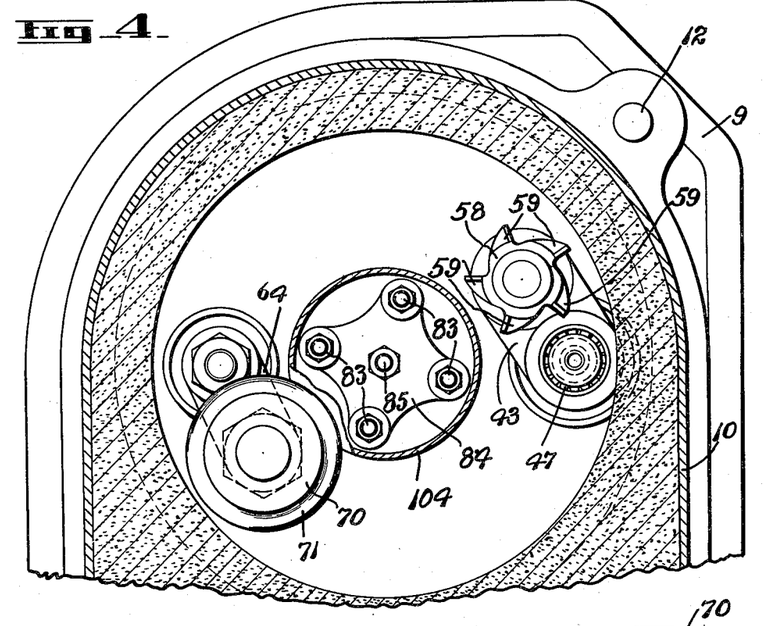
Fig. 4 is a fragmentary horizontal section substantially on the plane of line A—A of Fig. 2.

The table 20 has an opening 60 therein (Fig. 8) and it is evident that the cutting head 58 and its shaft together with the arms 43, swing from an inner position with respect to the sand mold (as shown in Fig. 4) to an outer position wherein the cutters 59 are brought to and cut into the walls of the mold and thus cut the grooves which are to be made, (as in Fig. 3). In order that the sand which is removed in cutting the grooves, shall not get into the mechanism, particularly the upper bearings at 47 and the gears 48 and 57, a shielding plate 61 of sheet metal is attached in the manner shown in Fig. 8 covering the opening 60 and preventing sand entrance.

Figure 9:
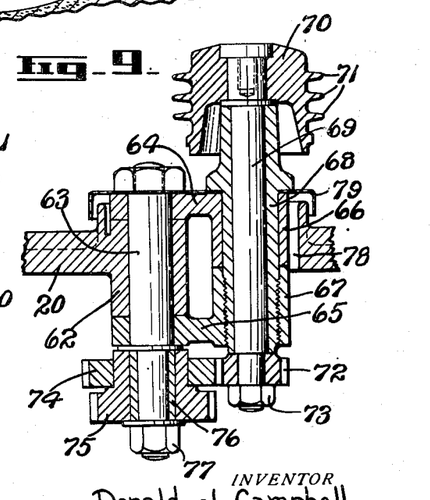

The groove smoothing mechanisms, one each unit for the two unit machine described, are also mounted on the table 20 substantially diametrically opposite the groove cutting mechanisms just described. A short vertical sleeve 62 (Fig. 9) is cast integral with and extends downwardly from the table 20 and has a rod or shaft 63 mounted in and extending therethrough. Upper and lower arms 64 and 65 are located at the upper and lower ends of each sleeve 62, the shaft 63 passing therethrough and said arms having downwardly and upwardly extending sleeves 66 and 67 respectively at their free ends which are in abutting engagement, as shown in Fig. 9. The lower sleeve 67 is interiorly threaded. A long sleeve 68, exteriorly threaded at its lower end portion, passes through both sleeves 66 and 67 having a bearing shoulder at its upper portion to bear upon the upper arm 64. A shaft 69 passes through the sleeve 68. Said shaft 69, at its upper end, has a smoothing head 70 fixed thereto from which a plurality of continuous smoothing ribs 71 project which are spaced apart the same distance as the three series of cutters 59 on the cutting head 58 and lie in the same horizontal planes therewith. A pinion 72 is fixed to the lower end of the shaft 69 and held securely in place by nut 73. The pinion 72 is in meshing engagement with a gear 74 mounted upon the hub of a second gear 75 which is rotatably mounted on and around a bearing sleeve 76 on the lower end of the shaft or rod 63, which in turn at its lower end has a nut 77 to hold the gears in place. As shown in Fig. 2, the gear 75 is in driving engagement with the stationary gear 16 or shaft 15.

The groove smoothing unit may swing about the axis of the shaft 63, there being an opening 78 in the table 20 to permit such movement, so that the grooved smoothing head may move from a position, such as shown in Fig. 4, to the position shown in Fig. 3 wherein the smoothing ribs 71 enter the grooves already cut by the cutters 59 and smooth and slick the same. A sand excluding cover 79 (Fig. 9) is likewise used to guard against sand falling downwardly into the gears or into any other parts of the mechanism. Normally, when free to do so, both the groove cutting and the groove smoothing units are drawn to the position shown in Fig. 4 by means of coiled tension springs as shown at 79a in Fig. 5.

Figure 1:
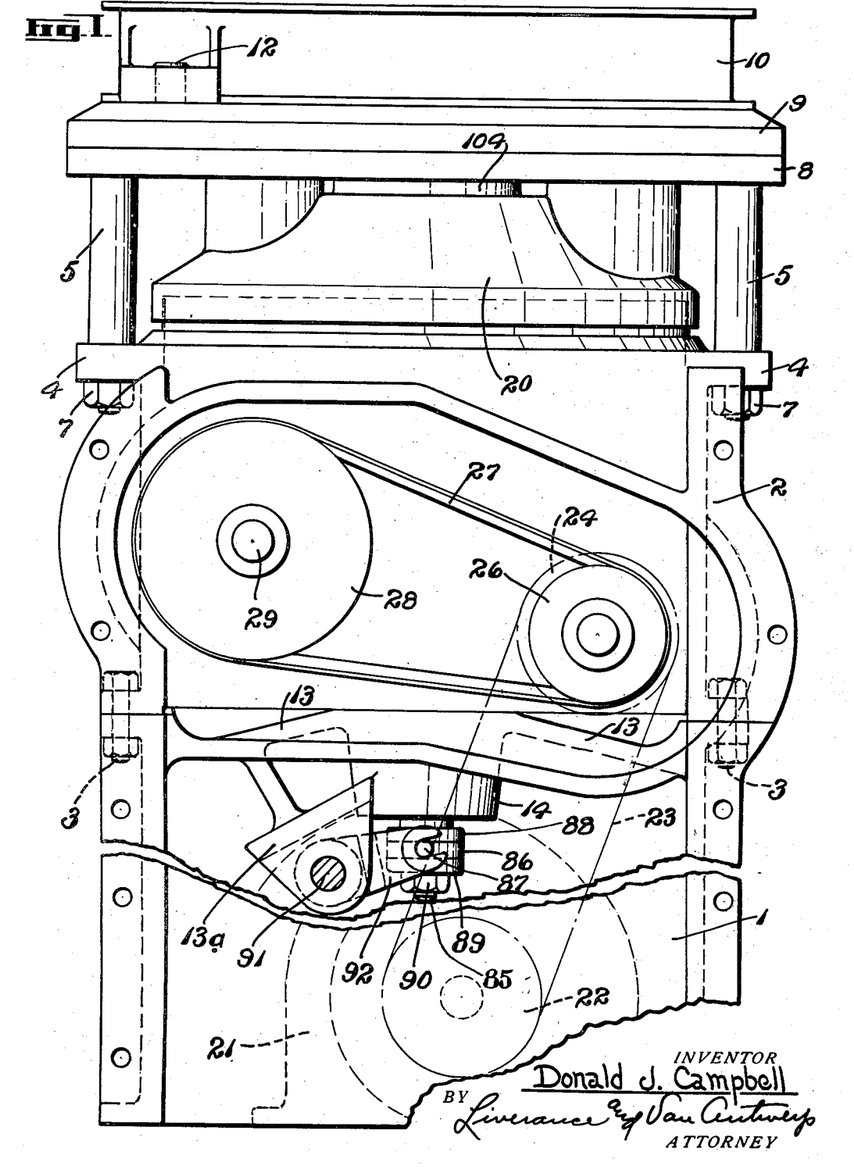
Fig. 1 is an elevation view of one section of a mold grooving machine made in accordance with my invention wherein the grooving of two mold cavities in a mold for the production of two brake drums is accomplished.
Figure 13:
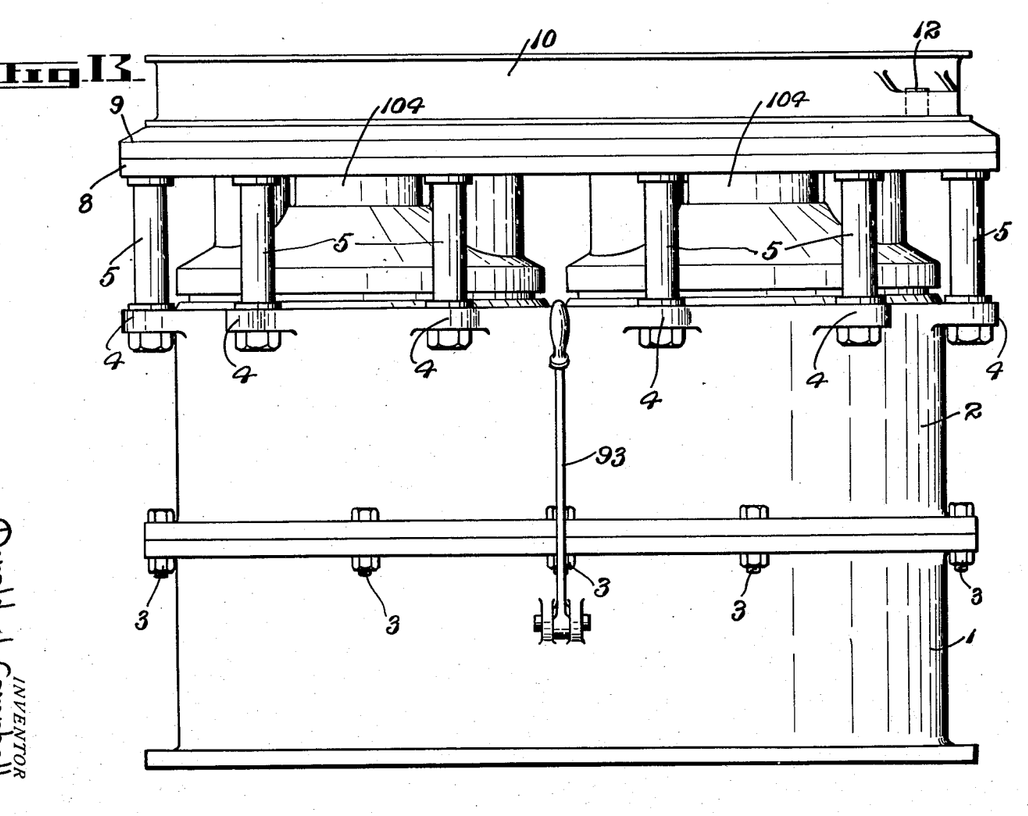
Fig. 13 is a side elevation of the entire machine.

From the arm 44 of the grooves cutting unit an arm 80 extends laterally and has a vertical spindle on which an adjustable cam 81, with a conical upper end, is eccentrically mounted (Figs. 2 and 5). A similar arm 80a extends laterally from the arm 65 of the smoothing unit and has a head 81a with an inclined face similar to the conical surface of the member 81. It is to be understood that the member 81 does not turn about the pin on which it is mounted but may be adjusted to different positions thereon for controlling the relationship of the cutting unit and the smoothing unit. A collar 82 surrounds the hub 19 of the head which carries the groove cutting and smoothing mechanisms and at its lower portion is provided with an upwardly and outwardly inclined conical surface so that when the head is moved downwardly it first engages the member 81, thereby swinging the cutting head 58 and the cutters 59 thereon from the position shown in Fig. 4 to that shown in Fig. 3. Also, upon downward movement of the collar 82, the part 81a is engaged and the smoothing head 58 is likewise moved outwardly from the position shown in Fig. 4 to that shown in Fig. 3 to enter and smooth the grooves as they are cut. Rods 83 pass freely through the table 20 and are threaded at their lower ends into the member 82 and at their upper ends are connected to a spider 84 which in turn is secured at the upper end of an elongated rod 85 which extends axially through the entire length of the shaft 15. Below the hub 14, in which the shaft 15 is mounted (Fig. 1), a collar 86, having oppositely projecting studs 87, is secured between two collars 88 and 89 and held in place by a nut 90 threaded onto the lower end of the rod 85. A rock shaft 91 is mounted on a bracket 13a extending from the bracket or web 13 previously described. A yoke 92 is fixed on the shaft 91 and connects with the studs 87 so that by rocking the shaft 91 in a clockwise direction (Fig. 1) the rod 85 and collar 82 are moved in a downward direction. A manually operable handle 93 (Fig. 13) is pivotally mounted on the lower section 1 of the machine at its outside and through suitable connections with the rock shaft 91 rocks said shaft to draw the rod 85 downwardly and thus move the member 82 first into engagement with the part 81 and then 81a to thereby move the groove cutters to the position shown in Fig. 3 to the grooves in the mold, together with the groove smoothing ribs into a position to engage the grooves which have been cut to smooth and slick the same. On backward movement of the lever 93 the conical operating head 82 is elevated whereupon the springs 79a draw the cutting and smoothing heads from their operative positions shown at Fig. 3 to the inoperative position shown in Fig. 4.

Figure 11:
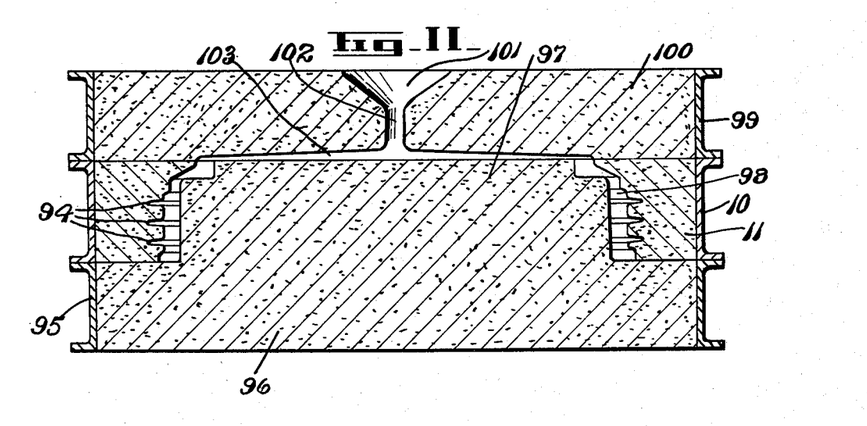
Fig. 11 is a transverse vertical sectional view of a completed mold for producing a cast annularly ribbed brake drum.
Figure 12:
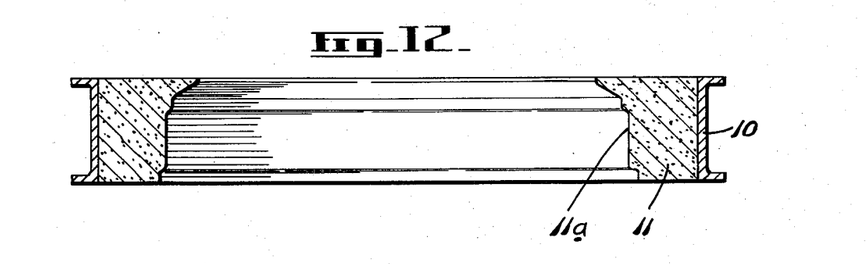
Fig. 12 is a transverse vertical sectional view of the intermediate member of the mold shown in Fig. 11 before the grooves have been made therein.

In Fig. 12 the green sand mold 11 within the flask 10, having the smooth cavity surfaces 11a, as previously described, is made in any suitable manner with the same packed or tamped or jarred to such a degree that the mold 11 is of a greater density and firmness than is usually the case with green sand molds. After the mold has been made in conformity with the disclosure shown in Fig. 12 it is placed upon the machine which has been described and the grooves cut and smoothed, thereby making a mold with grooves 94 as shown in Fig. 11. In casting a brake drum with this mold a bottom section to the mold is provided by flask 95 and with a green sand mold 96 therein, the same being of usual density and having a central projecting green sand core 97 which extends into the cavity of the mold 11, leaving a mold cavity space 98 into which molten metal is received to make the continuously ribbed flange of the cast brake drum. The mold is completed by an upper section which has a flask 99 carrying the green sand mold 100 therein, likewise of usual density, which at its upper side centrally above the core 97 is provided with a pouring basin 101 and a riser 102 and is so formed as to leave a mold cavity space 103 which connects with the mold cavity space 98 and wherein the web or back portion of the brake drum is made when molten iron is poured into the mold to fill all cavities.

As previously pointed out the sand shields 61 and 79 protect the mechanism of the gears and bearings in the groove cutting and groove smoothing units. Likewise a shield of sheet metal 10 (Fig. 2) covers the spider 84 and the parts immediately below the same so that sand does not get into the vertical passage of the shaft 15 through which the rod 85 passes.

It is apparent from the foregoing description that previously formed mold sections for brake drums may be very rapidly and economically grooved. All that has to be done is to place the previously formed annular portion of the mold to be grooved on the upper end of the machine, grasp the handle 93 and move it, whereupon the desired grooves are cut and slicked or smoothed. Then with a return of the handle 92 to its initial position the groove cutting and groove smoothing members are withdrawn from the grooves and the molds are removed from the machine without interference from the said member. While the machine is in operation the driving motor is operating all the time, and all that is necessary to be done for the workmen is to place the mold on the mold supporting member at the top of the machine, pull on the lever 93, move the lever back to its initial position, remove the grooved mold and then repeat the operation for succeeding molds. The operation, so far as the workmen are concerned, is exceptionally simple and there is required no skilled operator for the machine. Cutting the grooves in the mold is performed very rapidly and, therefore, economically. The invention has proved to be of great practical utility. It is defined in the appended claims and is to be considered comprehensive of all forms of structure coming within their scope.

I claim:

1. In a machine of the class described, a support, a flask and mold supporting table carried at the upper part of the support and having an opening therethrough, said table being adapted to support a sand mold at its upper side, the mold having a substantially cylindrical mold cavity therein to be located over the opening in the table, a vertical shaft, means to hold the same rigid, a frame revolubly mounted on the shaft, a cutting head revolubly mounted on the frame and extending above the table, means for mounting the head to swing about a vertical axis spaced out of alinement with the said vertical shaft, means for driving said head, said head having a plurality of series of cutters thereon located in spaced apart horizontal planes whereby on swinging the cutter in one direction, the cutters are brought to the mold and grooves cut therein around and in conjunction with the mold cavity of said mold.

2. In a machine of the class described, a support, a horizontal table having an opening therethrough carried at the upper part of the support, said table being adapted to support a sand mold having a substantially cylindrical mold cavity therein located over the opening in the table, a member mounted for rotation below the table, two vertical shafts carried by the member, means for mounting said shafts on said member whereby they may be swung about vertical axes, a head attached to the upper end of each shaft and extending through the opening in the table, means for rotating both shafts and the heads attached thereto, one of said heads having a plurality of series of cutters located in different horizontal planes thereon and the other a like plurality of continuous annular ribs located in the same horizontal planes with the plurality of series of cutters and means for first swinging the shaft to which the cutter head is attached outwardly, whereby the cutters cut continuous grooves in the mold and thereafter swinging the other shaft and head outwardly whereby said annular ribs on the head enter said grooves and smooth the same.

3. A construction containing the elements in combination defined in claim 2, said means for swinging the cutting and smoothing heads and the shafts thereof outwardly comprising a cam member mounted for vertical movements, and cooperating cam members and arms carrying the same associated with the cutting and smoothing heads and the shafts which carry the same, and a pivotally mounted lever for manually moving said first mentioned cam member in a downward direction to thereby successively move the cutting head outwardly, followed by outward movement of the smoothing head.

4. A machine of the type described including a fixed shaft, a gear fixed onto said shaft, a supporting structure revolubly mounted upon said shaft above said gear, a cutting tool, means for revolubly and adjustably mounting the cutting tool so that it may be moved radially upon the supporting structure, a collar encircling the first mentioned shaft, a gear attached rigidly to the said collar, a second gear located on the cutting tool mounting means and meshing with the gear on the collar, means for rotating the collar and means for rotating the supporting frame structure.

5. A combination of elements as set forth in claim 4 in which said frame structure has a second revolubly mounted tool thereon and means for rotating the tool including gears meshing with said gear on said fixed shaft.

6. In combination, a vertical shaft having an axial opening therethrough, a table member revolubly mounted upon the said shaft so as to rotate about its vertical axis, two tools, means for revolubly and adjustably mounting said tools upon the table, means for rotating the tools and means for adjusting the tools radially, said last mentioned means including a rod extending through the said axial opening.

7. In a machine of the character described, a shaft having a frame structure rotatably mounted on said shaft, a groove cutting tool mounted on said frame, a groove smoothing tool mounted on said frame in spaced relation to the said groove cutting tool, means for moving the said cutting and smoothing tools outwardly from the axis of said frame and means for rotating the said frame, groove cutting tool and groove smoothing tool about the said shaft.

8. In combination, a revolving supporting head, a cutter movably mounted upon said head, a smoother, means to movably mount the smoother upon said supporting head, and means for moving the cutter outwardly and additional means for moving the smoother outwardly in a predetermined relationship to the cutter.

9. In a device of the class described, a revolving supporting head, a cutter movably mounted thereon, a smoother movably mounted thereon, means for moving both the cutter and the smoother outwardly and additional means for automatically retracting the smoother and cutter when the first mentioned means is rendered inoperative.

10. A machine of the type described including a revolving supporting table, a rotating cutter, means for mounting the cutter for radial movement with respect to the axis of rotation of the table, a revolving smoother, means for mounting the smoother for radial movement similarly to the cutter, means for moving the cutter mounting means and the smoother mounting means progressively outward and means for retracting the same when desired.

11. A combination of elements as set forth in claim 10 in which means is provided for varying the operative radial dimension of the smoother relatively to the cutter.

12. In combination, a supporting means, a revolving table mounted therein, means to rotate said table, a groove cutter revolubly mounted upon said table at a point outwardly from its center, a revolving smoother, means for mounting the smoother so that it may be moved outwardly from the axis of the table and means for moving the revoluble groove cutter and the smoother synchronously for the purpose described.

13. In a machine of the class described, a horizontal ring-like table having a central opening adapted to support a sand mold thereon, the mold having a mold cavity of cylindrical form disposed over said opening in the table, a cutting head, a shaft on which said head is mounted, means for driving said shaft, said cutting head extending above the table and into the mold cavity and having a plurality of series of spaced apart projecting cutters thereon, each series being located in a horizontal plane, means for moving the cutting head toward the mold whereby the cutters engage the sand of said mold and cut continuous grooves in the mold in spaced apart relation to each other, said grooves communicating with the mold cavity, driven means including a rotatable head having a plurality of annular ribs extending therefrom and located in the same planes as the plurality of series of cutters on the cutting head, and means to move said head to enter said annular ribs into the grooves cut, said ribs smoothing the surfaces of the sand of said mold at said grooves.

DONALD J. CAMPBELL.